(12) United States Patent
Li

(10) Patent No.: US 12,033,303 B2
(45) Date of Patent: Jul. 9, 2024

(54) MITIGATION OF QUANTIZATION-INDUCED IMAGE ARTIFACTS

(71) Applicant: KYOCERA Document Solutions, Inc., Osaka (JP)

(72) Inventor: Sheng Li, Irvine, CA (US)

(73) Assignee: KYOCERA DOCUMENT SOLUTIONS, INC., Osaka (JP)

(*) Notice: Subject to any disclaimer, the term of this patent is extended or adjusted under 35 U.S.C. 154(b) by 174 days.

(21) Appl. No.: 17/666,917

(22) Filed: Feb. 8, 2022

(65) Prior Publication Data
US 2023/0252603 A1 Aug. 10, 2023

(51) Int. Cl.
G06T 3/40 (2024.01)
G06T 3/4046 (2024.01)
G06T 3/4069 (2024.01)
G06V 10/56 (2022.01)
G06V 10/762 (2022.01)
G06V 10/764 (2022.01)

(52) U.S. Cl.
CPC .......... *G06T 3/4069* (2013.01); *G06T 3/4046* (2013.01); *G06V 10/56* (2022.01); *G06V 10/762* (2022.01); *G06V 10/764* (2022.01)

(58) Field of Classification Search
CPC ..... G06T 3/4069; G06T 3/4046; G06V 10/56; G06V 10/762; G06V 10/764
See application file for complete search history.

(56) References Cited

U.S. PATENT DOCUMENTS

| | | | |
|---|---|---|---|
| 9,275,281 | B2 | 3/2016 | Macciola |
| 10,062,173 | B1* | 8/2018 | Padfield ................. G06V 20/20 |
| 10,410,028 | B1 | 9/2019 | Cansizoglu et al. |
| 10,489,887 | B2 | 11/2019 | El-Khamy et al. |
| 10,491,238 | B2 | 11/2019 | Sudhakaran et al. |
| 10,650,495 | B2* | 5/2020 | Zhang ................... G06F 18/213 |
| 10,699,174 | B1 | 6/2020 | Spiegel et al. |
| 11,508,034 | B2* | 11/2022 | Li ........................... G06T 7/194 |
| 2018/0293707 | A1* | 10/2018 | El-Khamy ............ G06T 3/4076 |
| 2019/0362191 | A1 | 11/2019 | Lin et al. |
| 2020/0026986 | A1 | 1/2020 | Ha et al. |
| 2020/0074672 | A1 | 3/2020 | Hoff |
| 2020/0090305 | A1 | 3/2020 | El-Khamy et al. |
| 2020/0210703 | A1 | 7/2020 | Charlton et al. |
| 2021/0327028 | A1* | 10/2021 | Machii .................. G06T 3/4076 |
| 2022/0198610 | A1* | 6/2022 | Kulikov ................... G06N 3/08 |
| 2022/0237739 | A1* | 7/2022 | Li .......................... G06T 3/4053 |
| 2022/0270207 | A1* | 8/2022 | Chen ...................... G06N 3/045 |

(Continued)

OTHER PUBLICATIONS

He et al., 2020, "Facial Image Synthesis and Super-Resolution With Stacked Generative Adversarial Network" (Year: 2020).*

(Continued)

*Primary Examiner* — Manav Seth
(74) *Attorney, Agent, or Firm* — Rowan TELS LLC

(57) ABSTRACT

A system for super-sampling digital images detects artifacts in an SRGAN super-sampled image, determines blocks of the image that contribute to the artifacts, and if the artifact-contributing blocks exceed a threshold, discards the SRGAN generated output image in favor of applying a super-sampled image generated by an alternate mechanism, such as a nearest neighbor algorithm.

20 Claims, 7 Drawing Sheets

(56) References Cited

U.S. PATENT DOCUMENTS

| 2023/0252603 A1* | 8/2023 | Li | G06V 10/56 |
| | | | 382/299 |
| 2023/0300383 A1* | 9/2023 | Lu | H04N 19/87 |
| | | | 375/240.12 |

OTHER PUBLICATIONS

BusInvert_coding_for_low-power_I_O_VOL3_NO_I_MARCH_1995_STAN.
More_is_less_Improving_the_energy_efficiency_of_data_movement_via_opportunistic_use_of_sparse_codes_SONG_entire_dcument.

* cited by examiner

MITIGATION OF QUANTIZATION-INDUCED IMAGE ARTIFACTS

BACKGROUND

Super-Resolution Generative Adversarial Networks (SR-GAN) are a technology for performing super-resolution on digital images. An SRGAN neural network may be configured with 32-bit floating point settings. However in some applications, such as in embedded system applications, a network comprising 32-bit values (e.g., for weights, activations, and other settings) consumes too much memory and power. One solution is to convert the 32-bit floating values to a lower-precision format, such as 8-bit fixed point format. However, this may result in image artifacts when upsampling images with the resulting SRGAN.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of systems utilizing SRGAN are disclosed for image upscaling (also referred to herein as "upsampling"), in which the 32-bit floating point SRGAN settings are converted to 8-bit fixed-point settings to reduce the network size with acceptable accuracy loss. Upscaling/upsampling is the process of adding pixel resolution to a digital image (or video). The SRGAN is calibrated with a selected set of images to limit the accuracy loss of the fixed point network compared with the floating point network.

Figure 1A:
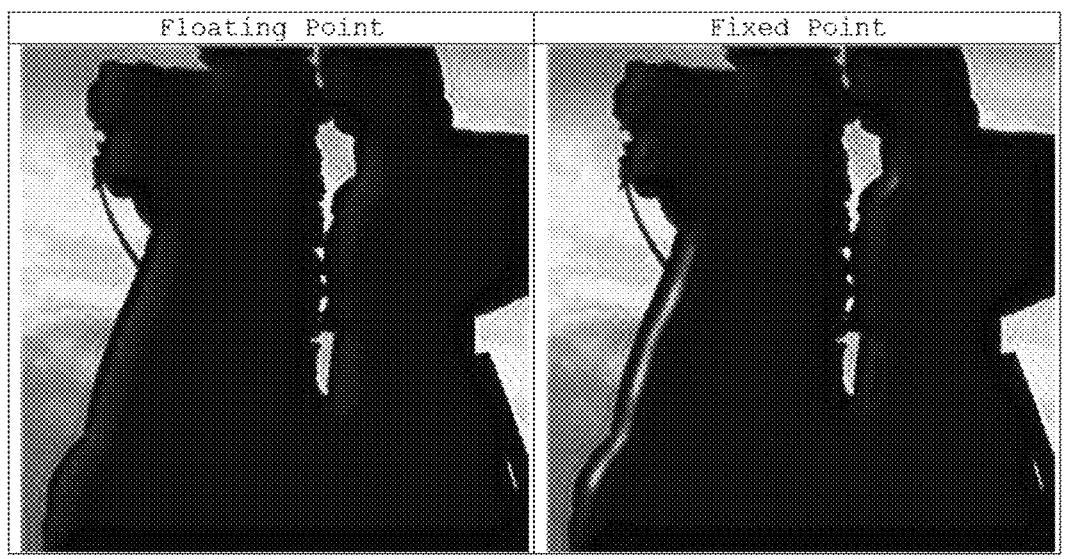
FIG. 1A depicts example output images from different SRGANs.

The calibrated SRGAN neural network generates output images without noticeable artifacts in many cases. However, because the calibration images are pre-selected and of limited quantity, it is not possible to calibrate the network with all types of images that the network may operate on in practice. In the field, the network may encounter outlier images it was not calibrated to handle, resulting in noticeable artifacts in the output image. FIG. 1A depicts an example. In FIG. 1A, the fixed point SRGAN output image on the right side has a noticeable artifact on the left edge of horse's neck.

In this case, the original image (FIG. 1B) is a poor quality, low resolution image with a sharp contrast between the foreground statues and the background sky. The calibration image set for the fixed-point SRGAN lacked an image with such attributes, leading to the artifacts in the (upsampled) output image. One solution that does reduce the artifacts in the output image is to add an image similar attributes to the calibration image set. However, as noted above, there will typically be some kinds of the images encountered in the field that don't match well to one of the images in the calibration image set.

Figure 2:
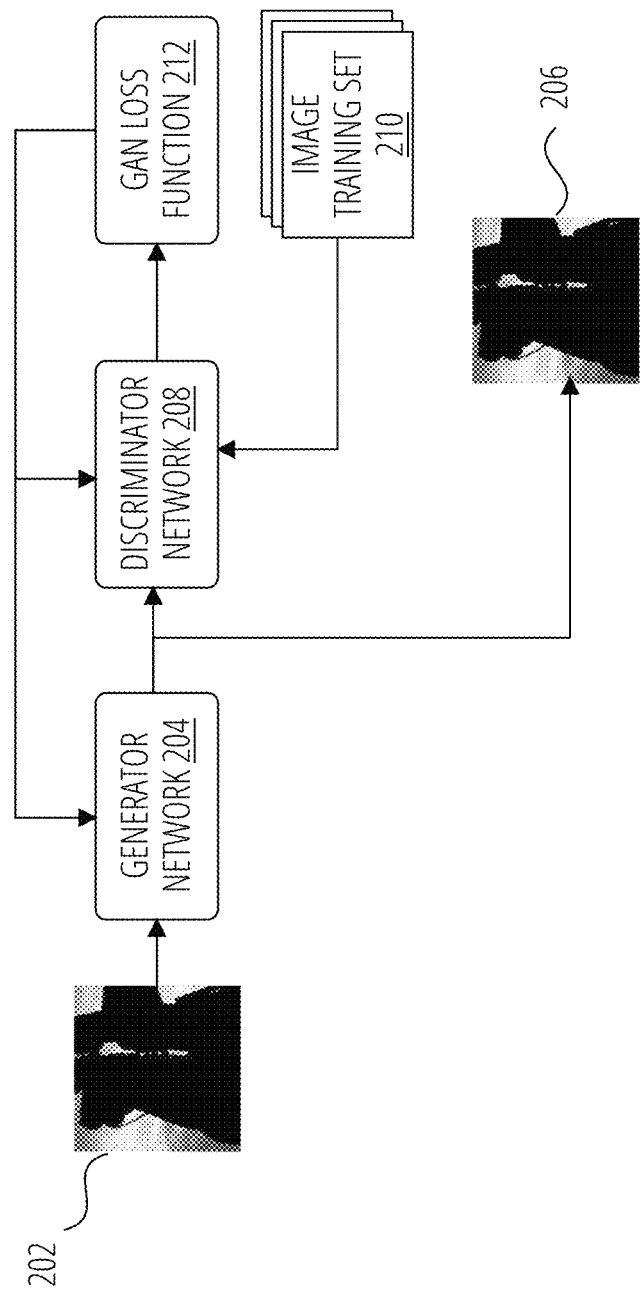
FIG. 2 depicts SRGAN in accordance with one embodiment.

FIG. 2 depicts an SRGAN in one embodiment. The SRGAN receives a low-resolution image 202 into a generator network 204 that generates a higher-resolution image 206 that is input to a discriminator network 208 configured with an image training set 210. A GAN loss function 212 is backpropagated to adapt the configuration of both of the generator network 204 and the discriminator network 208.

Figure 3:
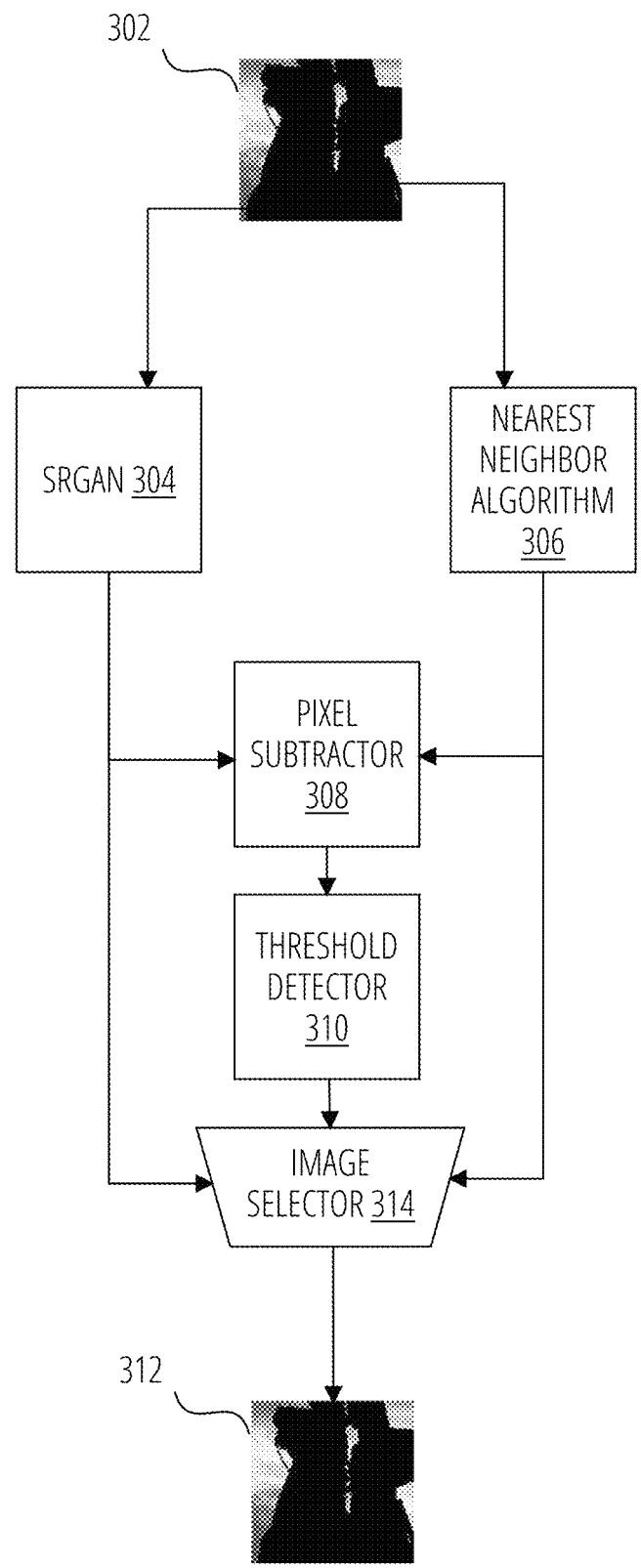
FIG. 3 depicts a digital image super-resolution system in one embodiment.

FIG. 3 depicts an image super-resolution system in one embodiment. A low resolution image 302 is input to both of an SRGAN 304 and a nearest neighbor algorithm 306 (e.g., a conventional such algorithm), each of which generate an upsampled image. The two upsampled images are provided to a pixel subtractor 308 for comparison. The result of the pixel subtraction on the two upsampled images is provided to a threshold detector 310 that generates a selection to an image selector 314 (which may be a simple software 'switch', e.g., if-then construct) of either the output of the SRGAN 304 or the output of the nearest neighbor algorithm 306 for the final higher resolution image 312.

Although the examples throughout this description are described using a nearest neighbor algorithm as the fallback algorithm to the SRGAN, it should be understood that other fallback algorithms may be utilized instead (including more than one fallback algorithm). Preferably, the fallback algorithm is floating point in nature and the SRGAN is fixed point in nature (e.g., reduced from a floating point deep neural network to a fixed point deep neural network).

In one embodiment, the low resolution image is provided to a printer in a digital document (e.g., as a file, or embedded in a word processing document), or by way of a scanner (which may be part of the printer). The printer utilizes the system depicted in FIG. 3 to upsample the low resolution image and to select a final image to output in a printed document.

Figure 4:
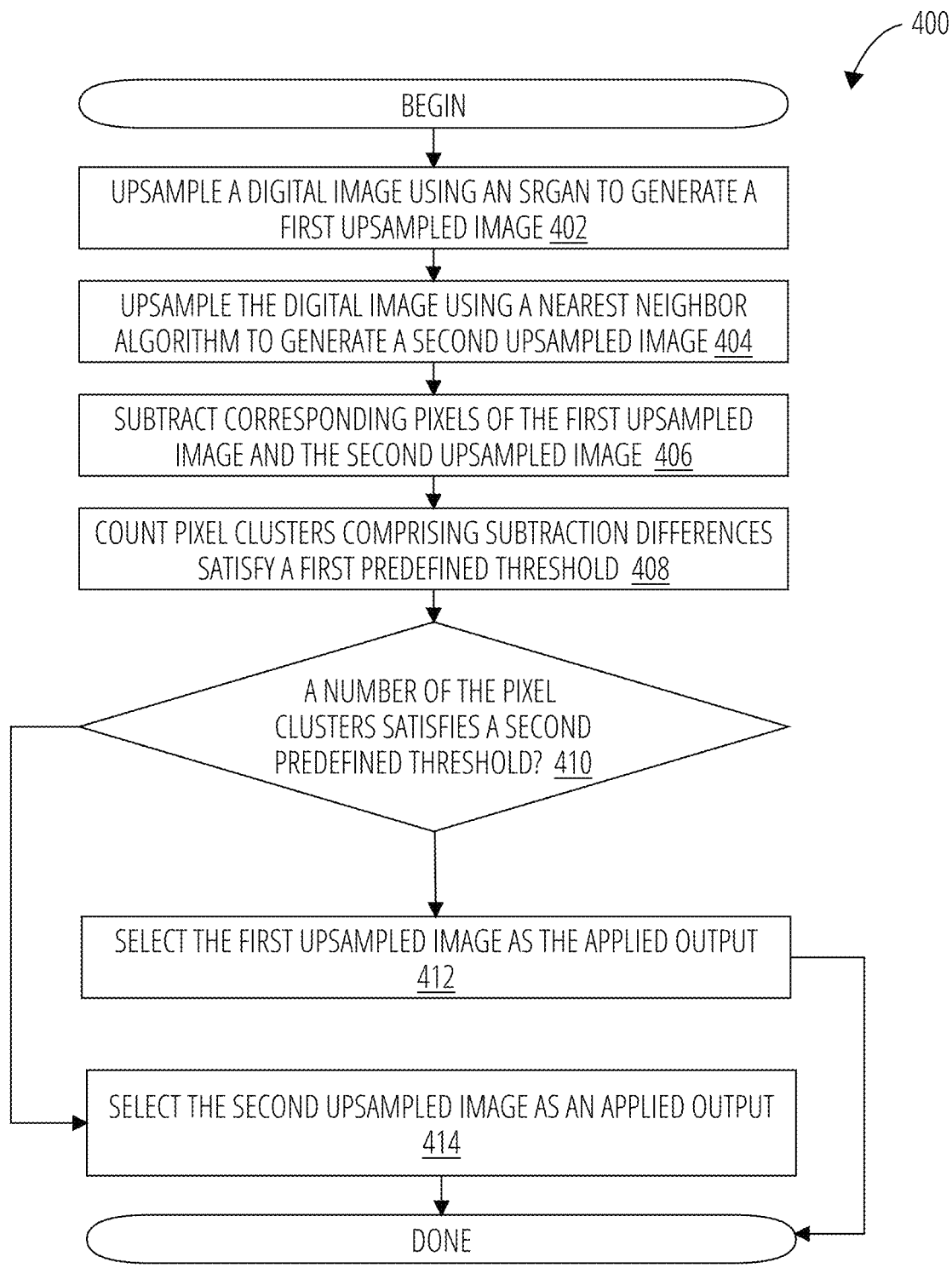
FIG. 4 depicts a super-resolution process 400 in accordance with one embodiment.

FIG. 4 depicts a super-resolution process 400 in accordance with one embodiment. A digital image is upsampled using an SRGAN to generate a first upsampled image (block 402). The digital image is also upsampled using a nearest neighbor algorithm to generate a second upsampled image (block 404). Corresponding pixels of the first upsampled image and the second upsampled image are subtracted (block 406), and a count is performed of pixel clusters comprising subtraction differences that satisfy a first predefined threshold (block 408). If (on condition that) a number of the pixel clusters satisfy a second predefined threshold (decision block 410), the second upsampled image is selected for the final output that is applied (block 414); otherwise, the first upsampled image is selected to be the final output (block 412).

Figure 1B:
FIG. 1B depicts an original image from which the upsampled images in FIG. 1A are generated.
Figure 5A:
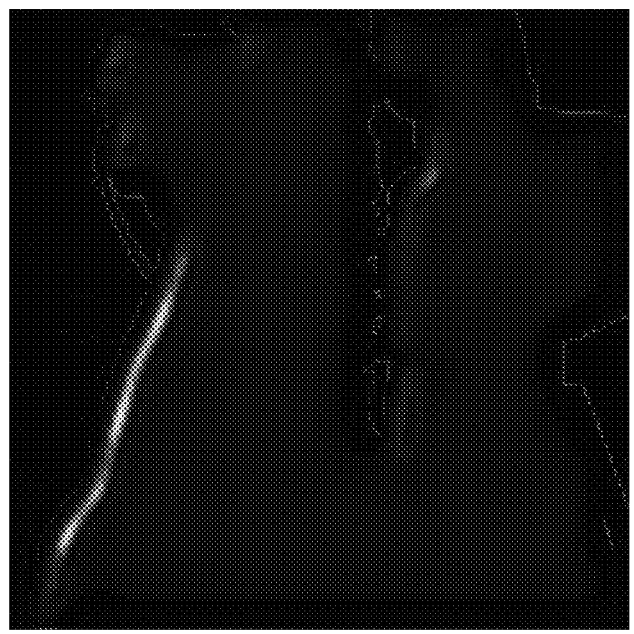
FIG. 5A and FIG. 5B depict an example of a difference image.
Figure 5B:
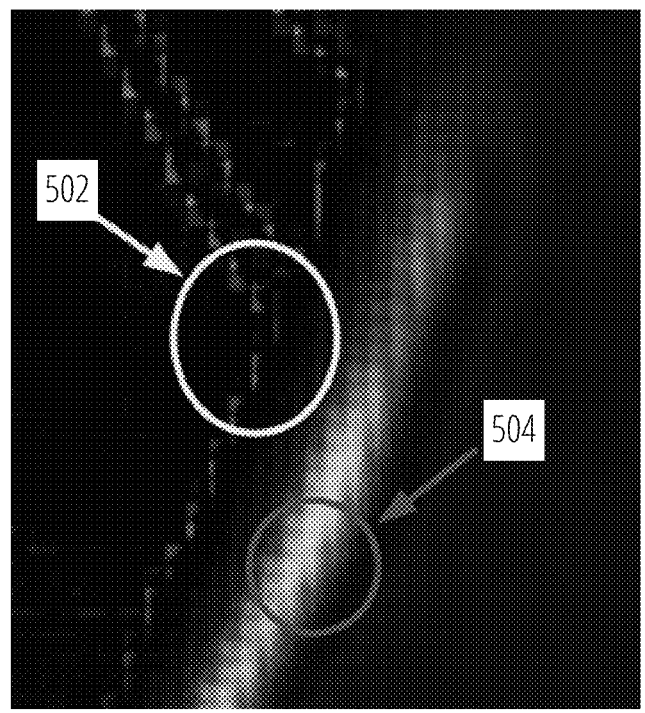

Applying the super-resolution process 400 to the upsampled images generated from the low resolution image 302 depicted in FIG. 1B yields, in one embodiment, the difference image depicted in FIG. 5A. The thin line on the outline of the statues (region 502 in FIG. 5B) is expected due to edge sharpening by the SRGAN. The width of this line may be about one to two pixels wide. The artifact area (region 504 in FIG. 5B), which is the thick line next to the outline of the horse's neck, is more than two pixels wide. In FIG. 5A and FIG. 5B, lighter areas indicate a greater difference value for the pixels in that area (dark colors indicate only a small difference between pixel values in the two generated images).

This mechanism is thus unlike conventional approaches that compare the upsampled image (or a down-sampled version thereof) to the downsampled original, and does not necessitate the computation of statistical comparison metrics such as average pixel values over a region. In this regard it may be more computationally efficient especially for large images.

To differentiate the region 502 from the region 504, clusters of pixels may be tested and counted, rather than counting individual pixel differences. The clusters may take the form of blocks, which are contiguous sets of pixels that vary both in their x and y coordinates/indexes (for two-dimensional digital images). For example, 2×2 pixel blocks may be tested in one embodiment. Depending on the desired final image resolution, and on the nature and size of the images, other sized pixel blocks may also be utilized, for example 4×4 blocks, or rectangular blocks (e.g., 2×3 pixels). On condition that some or all pixels in a block have differences that satisfy (e.g., meet or are above) a pre-defined threshold, the cluster may be identified as artifact pixel cluster. On condition that a number of artifact clusters satisfies a second preconfigured threshold, the SRGAN image may be discarded and the super-resolution image generated by an alternate algorithm (e.g., nearest neighbor algorithm) may be selected for the final application (display, printing, scanner output etc.).

In one embodiment, multiple threshold levels are established and the system proceeds as follows:

1. An SRGAN performs convolution neural network based 4X upsampling of an low resolution input image.
2. A nearest neighbor algorithm is applied to also perform 4X upsampling of the low resolution input image.
3. Subtract each corresponding pixels of the SRGAN output image and the nearest neighbor algorithm output image (e.g., in RGB space). Subtraction may in one embodiment take the form of subtracting (which herein includes other forms of comparison, such as XORing) the integer values represented by the entire bit sequence for each pixel from one another (e.g., all the pixel bits, including color values and intensity values, for example). Subtraction in other embodiments may involve subtracting the values of some but not all bits of the pixel values; for example, subtracting or otherwise comparing (e.g., XORing) only color values, or only intensity values, or only saturation values, etc. Subtraction in yet another embodiment may take the form of subtracting corresponding color value fields (e.g., red, green, and blue components) from one another in each pixel, to obtain difference values for each color component (this may also be done for other components, such as intensity). In one embodiment, if the pixel values differ by more than some percent or absolute amount in any one field (e.g., in a color field), the pixel is counted toward a threshold number of differences (see #4 next). Other embodiments may require that multiple corresponding fields (e.g., some threshold number of fields) of the two pixel values differ by some amount or percent before the pixel is counted in #4 below. The specific thresholds and/or number and which fields of the pixel values selected for the evaluation is a design choice based on accuracy, processing efficiency, and in some cases the nature of the images themselves (e.g., color content, contrast, brightness, etc.).
4. Identify and count 4-pixel clusters wherein a threshold number of the pixel differences (e.g., 2, 3, or all) each satisfy a threshold level. For example if three out of four (or all) of the pixels in the cluster have a difference exceeding a threshold, the pixel cluster may be identified as an artifact.
5. On condition that the count of the clusters satisfies a threshold level, discard the SRGAN output image and apply the nearest neighbor algorithm output image. This threshold may be a percent of blocks in the image (e.g., ≥5%), or an actual number of the blocks. A range of thresholds utilized in practical applications may be fall between 1% and 7% of the blocks in the image. In some embodiments, the system may further test whether the count of artifact blocks is concentrated in certain areas of the image, and may adjust the threshold accordingly. For example, if the artifact blocks are concentrated in visually less prominent areas of the image, a higher threshold percentage or count of artifact blocks may be acceptable (and vice versa). In one embodiment, a lower threshold is applied for the artifact block count in high contrast areas of the image than for other areas of the image. In other words, the overall artifact block threshold may be for example 7%, but if 1% of these fall on high contrast areas of the image, the image is rejected in favor of the alternate image that was generated.

The stride size between pixel blocks that are analyzed may be set according to the performance and resolution requirements of the implementation. A stride size of one (1) may be utilized in some embodiments, meaning that the window for the pixel block shifts by one pixel in any one particular dimension of the image each iteration (i.e., the window slides left to right across the image, and down one pixel to start a new row). Greater stride sizes may reduce the accuracy of the comparison by may speed up the process because there is less overlap between adjacent blocks.

Software Implementations

The systems disclosed herein, or particular components thereof, may in some embodiments be implemented in whole or in part as software (which may be 'firmware') comprising instructions executed on one or more programmable device. By way of example, components of the disclosed systems may be implemented as an application, an app, drivers, embedded logic, or services. In one particular embodiment, the system is implemented as a service that executes as one or more processes, modules, subroutines, or tasks on a server device so as to provide the described capabilities to one or more client devices over a network. In another particular embodiment, the system is implemented as embedded logic in a printer or scanner. The system need not necessarily be accessed over a network and could, in some embodiments, be implemented by one or more app or applications on a single device or be distributed between devices, for example.

In the following description, "algorithm" refers to any set of instructions configured to cause a machine to carry out a particular function or process. "App" refers to a type of application with limited functionality, most commonly associated with applications executed on mobile devices. Apps tend to have a more limited feature set and simpler user interface than applications as those terms are commonly understood in the art. "Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system. "Instructions" refers to stored signals representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device. "Module" refers to a computer code section having defined entry and exit points. Examples of modules are any software comprising an application program interface, drivers, libraries, functions, and subroutines. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client. "Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

Figure 6:
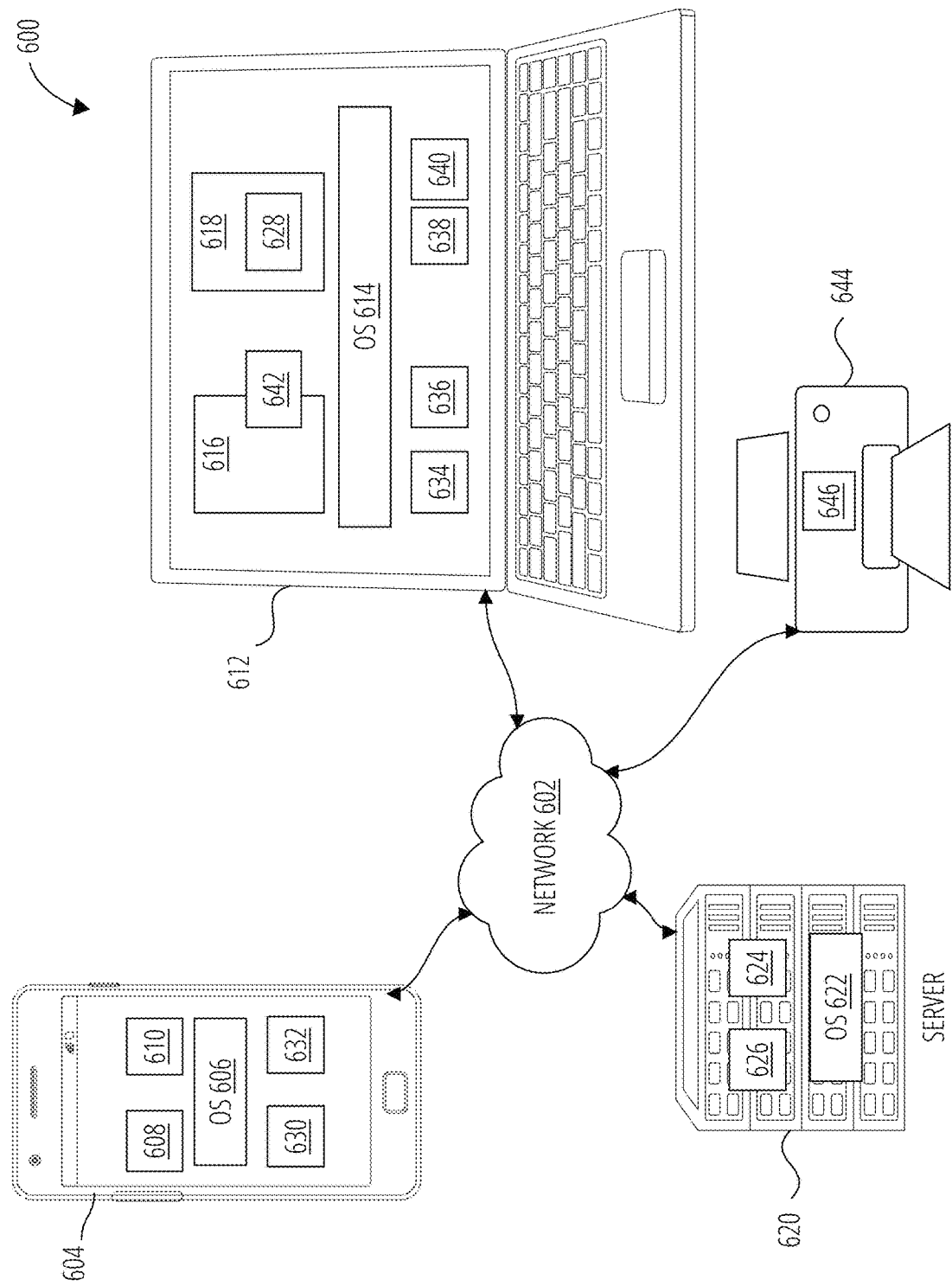
FIG. 6 depicts a client server network configuration 600 in accordance with one embodiment.

Referring to FIG. 6, a client server network configuration 600 illustrates various computer hardware devices and software modules coupled by a network 602 in one embodiment. Each device includes a native operating system, typically pre-installed on its non-volatile memory, and a variety of software applications or apps for performing various functions.

The mobile programmable device 604 comprises a native operating system 606 and various apps (e.g., app 608 and app 610). A computer 612 also includes an operating system 614 that may include one or more library of native routines to run executable software on that device. The computer 612 also includes various executable applications (e.g., application 616 and application 618). The mobile programmable device 604 and computer 612 are configured as clients on the network 602. A server 620 is also provided and includes an operating system 622 with native routines specific to providing a service (e.g., service 624 and service 626) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 612, mobile programmable device 604, and/or server 620. Any of these devices may employ a loader to place the executable and any associated library in memory for execution. The operating system executes the program by passing control to the loaded program code, creating a task or process. An alternate means of executing an application or app involves the use of an interpreter (e.g., interpreter 628).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 630 or driver 632 on the mobile programmable device 604 or computer 612 (e.g., driver 634 and driver 636) might enable wireless headphones to be used for audio output(s) and a camera to be used for video inputs. Any of the devices may read and write data from and to files (e.g., file 638 or file 640) and applications or apps may utilize one or more plug-in (e.g., plug-in 642) to extend their capabilities (e.g., to encode or decode video files).

The network 602 in the client server network configuration 600 can be of a type understood by those skilled in the art, including a Local Area Network (LAN), Wide Area Network (WAN), Transmission Communication Protocol/Internet Protocol (TCP/IP) network, and so forth. These protocols used by the network 602 dictate the mechanisms by which data is exchanged between devices.

Any of the depicted computing devices may in one embodiment access a printer 644 (which may also comprise a scanner) comprising embedded logic 646 to implement aspects of the described systems and mechanisms. The printer 644 may be accessed via the network 602 or directly via a cable or wireless link, for example.

Machine Embodiments

Figure 7:
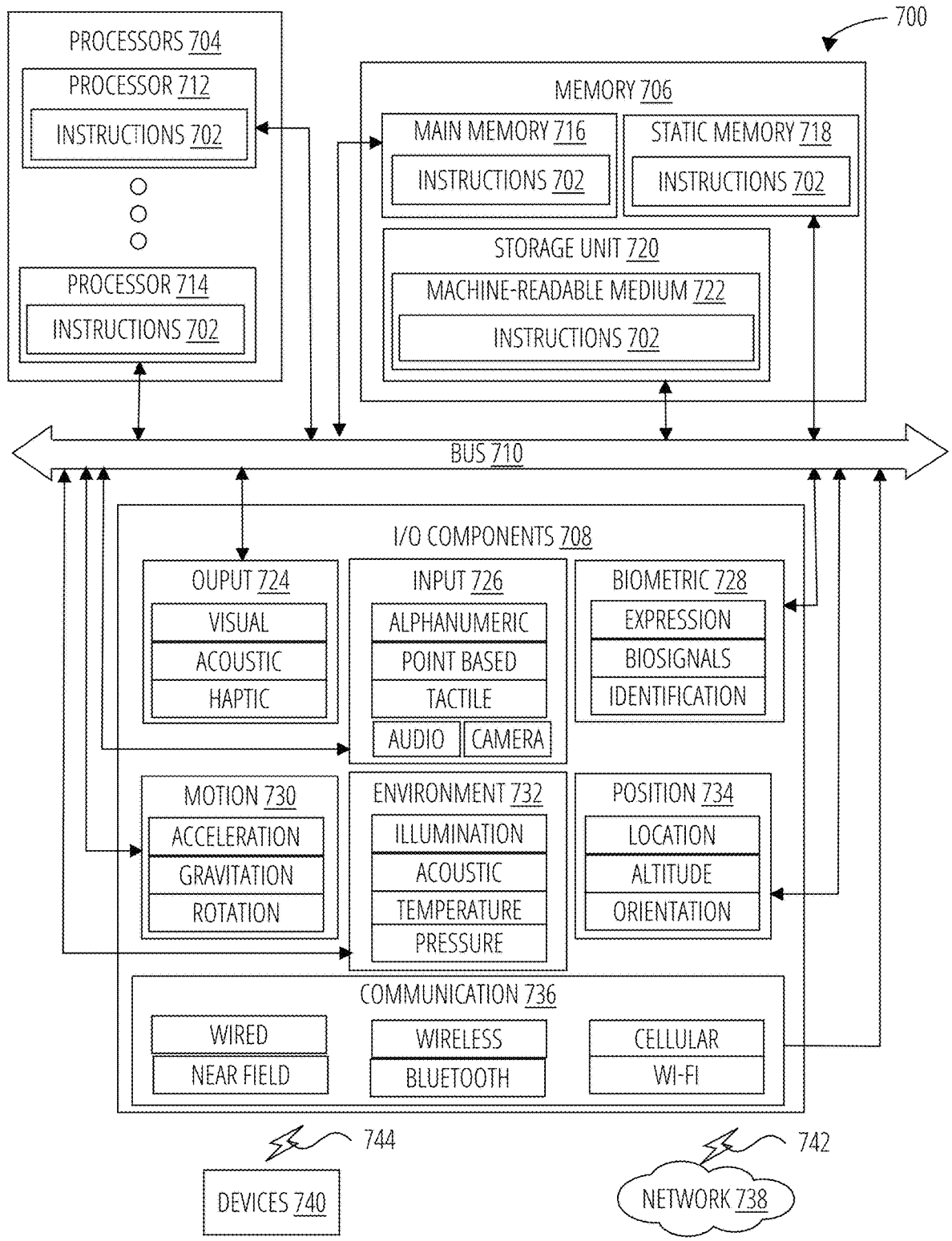
FIG. 7 depicts a machine 700 within which logic may be implemented for causing the machine to perform any one or more of the methodologies discussed herein, according to an example embodiment.

FIG. 7 depicts a diagrammatic representation of a machine 700 within which logic may be implemented to cause the machine to perform any one or more of the functions or methods disclosed herein, according to an example embodiment. The machine 700 may for example implement any of the devices depicted in FIG. 6, including for example the printer 644 or a scanner. It will be appreciated that in practice the machine 700 may include more or fewer input and/or output components than the ones depicted.

Specifically, FIG. 7 depicts a machine 700 comprising instructions 702 (e.g., a program, an application, embedded logic, an applet, an app, or other executable code) for causing the machine 700 to perform any one or more of the mechanisms discussed herein. The instructions 702 configure a general, non-programmed machine into a particular machine 700 programmed to carry out said functions and/or methods.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while only a single machine 700 is depicted, the term "machine" shall also be taken to include a collection of machines that individually or jointly execute the instructions 702 to perform any one or more of the methodologies or subsets thereof discussed herein.

The machine 700 may include processors 704, memory 706, and I/O components 708, which may be configured to communicate with each other such as via one or more bus 710. In an example embodiment, the processors 704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 712 and processor 714) to execute the instructions 702. The term "processor" is intended to include multi-core processors that may comprise two or more independent processors (sometimes referred to as "cores") that may execute instructions contemporaneously. Although FIG. 7 depicts multiple processors 704, the machine 700 may include a single processor with a single core, a single processor with multiple cores (e.g., a multi-core processor), multiple processors with a single core, multiple processors with multiples cores, or any combination thereof.

The memory 706 may include one or more of a main memory 716, a static memory 718, and a storage unit 720, each accessible to the processors 704 such as via the bus 710. The main memory 716, the static memory 718, and storage unit 720 may be utilized, individually or in combination, to store the instructions 702 embodying any one or more of the functionality described herein. The instructions 702 may reside, completely or partially, within the main memory 716, within the static memory 718, within a machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various example embodiments, the I/O components 708 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 708 may include biometric components 728, motion components 730, environmental components 732, or position components 734, among a wide array of possibilities. For example, the biometric components 728 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 may include acceleration sensor components (e.g., accelerometer), gravitation sensor components, rotation sensor components (e.g., gyroscope), and so forth. The environmental components 732 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 734 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 may include communication components 736 operable to couple the machine 700 to a network 738 or devices 740 via a coupling 742 and a coupling 744, respectively. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 706, main memory 716, static memory 718, and/or memory of the processors 704) and/or storage unit 720 may store one or more sets of instructions and data structures (e.g., software) embodying or utilized by any one or more of the methodologies or functions described herein. These instructions (e.g., the instructions 702), when executed by processors 704, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 738 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 738 or a portion of the network 738 may include a wireless or cellular network, and the coupling 742 may be a Code Division Multiple Access (CDMA) connection, a Global System for Mobile communications (GSM) connection, or another type of cellular or wireless coupling. In this example, the coupling 742 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 702 and/or data generated by or received and processed by the instructions 702 may be transmitted or received over the network 738 using a transmission medium via a network interface device (e.g., a network interface component included in the communication components 736) and utilizing any one of a number of well-known transfer protocols (e.g., hypertext transfer protocol (HTTP)). Similarly, the instructions 702 may be transmitted or received using a transmission medium via the coupling 744 (e.g., a peer-to-peer coupling) to the devices 740. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and/or data generated by execution of the instructions 702, and/or data to be operated on during execution of the instructions 702, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS 202 low-resolution image
204 generator network
206 higher-resolution image
208 discriminator network
210 image training set
212 GAN loss function
302 low resolution image
304 SRGAN
306 nearest neighbor algorithm
308 pixel subtractor
310 threshold detector
312 higher resolution image
314 image selector
400 super-resolution process 402 block
404 block
406 block
408 block
410 decision block
412 block
414 block
502 region
504 region
600 client server network configuration
602 network
604 mobile programmable device
606 operating system
608 app
610 app
612 computer
614 operating system
616 application
618 application
620 server
622 operating system
624 service
626 service
628 interpreter
630 driver
632 driver
634 driver
636 driver
638 file
640 file
642 plug-in
644 printer
646 embedded logic
700 machine
702 instructions
704 processors
706 memory
708 I/O components
710 bus
712 processor
714 processor
716 main memory
718 static memory
720 storage unit
722 machine-readable medium
724 output components
726 input components
728 biometric components
730 motion components
732 environmental components
734 position components
736 communication components
738 network
740 devices
742 coupling
744 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
    upsampling a digital image using a super-resolution generative adversarial network (SRGAN) to generate a first upsampled image;
    upsampling the digital image using a fallback algorithm to generate a second upsampled image;
    subtracting corresponding pixels of the first upsampled image and the second upsampled image;
    counting pixel clusters comprising subtraction differences satisfying a first predefined threshold;
    on condition that the count of the pixel clusters satisfies a second predefined threshold, selecting the second upsampled image as an applied output; and
    otherwise, selecting the first upsampled image as the applied output.

2. The method of claim 1, wherein the fallback algorithm is a floating point algorithm and the SRGAN is a fixed point network.

3. The method of claim 2, wherein the fallback algorithm is a nearest neighbor algorithm.

4. The method of claim 1, wherein the SRGAN comprises an 8-bit fixed point SRGAN converted from a 32-bit floating point SRGAN.

5. The method of claim 1, wherein subtracting corresponding pixels comprises individually subtracting different color fields of the corresponding pixels.

6. The method of claim 1, wherein the first predefined threshold comprises subtraction differences exceeding a third predefined threshold for all pixels in the pixel cluster.

7. The method of claim 1, wherein the second predefined threshold comprises between 1% and 5% of a total number of the pixel blocks in the first upsampled image.

8. The method of claim 1, wherein the second predefined threshold comprises a threshold specifically for high-contrast areas of the first upsampled image.

9. The method of claim 1, wherein the pixel clusters are 2×2 pixel blocks.

10. The method of claim 1, wherein the upsampling of the digital image by the SRGAN and by the nearest neighbor algorithm comprises a 4X upsampling.

11. A system comprising:
    at least one processor; and
    logic to operate the processor to:
        upsample a digital image using a super-resolution generative adversarial network (SRGAN) to generate a first upsampled image;
        upsample the digital image using a nearest neighbor algorithm to generate a second upsampled image;
        compare corresponding pixels of the first upsampled image and the second upsampled image;
        count pixel clusters for which the comparison satisfies a first predefined threshold;
        on condition that the count of the pixel clusters satisfies a second predefined threshold, select the second upsampled image as an applied output; and
        otherwise, select the first upsampled image as the applied output.

12. The system of claim 11, wherein the SRGAN comprises a fixed point SRGAN converted from a floating point SRGAN.

13. The system of claim 11, wherein comparing corresponding pixels comprises determining an overall color difference between the corresponding pixels.

14. The system of claim 11, wherein the pixel clusters are 2×2 pixel blocks.

15. The system of claim 14, wherein the 2×2 pixel blocks are determined using a stride length of one (1).

16. A system comprising:
    an SRGAN generated by quantizing a floating point deep network to a fixed point deep network;
    a floating point digital imaging algorithm;
    a digital image comparator;
    wherein the SRGAN is configured to receive and convert a low resolution digital image into a first higher resolution image, the floating point digital imaging algorithm is configured to receive and convert the low resolution digital image into a second higher resolution image, the digital image comparator is configured to compare the first higher resolution image and the second higher resolution image; and
    logic to:
        count pixel clusters for which the comparison satisfies a first predefined threshold; and
        on condition that the count of the pixel clusters satisfies a second predefined threshold, select the second higher resolution image instead of the first higher resolution image as an output image of a printer or digital display.

17. The system of claim 16, wherein the digital image comparator compares the first higher resolution image and the second higher resolution image on a multi-pixel block by block basis.

18. The system of claim 17, wherein the comparison satisfies the first predefined threshold when all of the pixels in a block each differ between the first higher resolution image and the second higher resolution image by a third threshold amount.

19. The system of claim 16, wherein the multi-pixel blocks are 2×2 pixel blocks.

20. The system of claim 19, wherein the 2×2 pixel blocks are determined using a stride length of one (1).

* * * * *